United States Patent
Zachary et al.

(10) Patent No.: US 7,499,761 B2
(45) Date of Patent: *Mar. 3, 2009

(54) VARIABLE FUNCTION VOTING SOLENOID-OPERATED VALVE APPARATUS HAVING AIR-TO-MOVE VALVE ACTUATORS AND TESTING METHOD THEREFOR

(75) Inventors: Bryan Zachary, Alvin, TX (US); Angela Summers, Houston, TX (US)

(73) Assignee: Sis-Tech Applications, L.P., Houston, TX (US)

( * ) Notice: Subject to any disclaimer, the term of this patent is extended or adjusted under 35 U.S.C. 154(b) by 702 days.

This patent is subject to a terminal disclaimer.

(21) Appl. No.: 10/957,393

(22) Filed: Oct. 1, 2004

(65) Prior Publication Data

US 2007/0227226 A1    Oct. 4, 2007

Related U.S. Application Data (60) Continuation-in-part of application No. 10/828,361, filed on Apr. 20, 2004, now abandoned, which is a continuation-in-part of application No. 10/663,588, filed on Sep. 17, 2003, now Pat. No. 6,862,914, which is a division of application No. 09/756,844, filed on Jan. 9, 2001, now Pat. No. 6,722,383.

(51) Int. Cl.
| | |
|---|---|
| G05B 11/01 | (2006.01) |
| E03B 1/00 | (2006.01) |
| E03B 7/07 | (2006.01) |
| F16K 37/00 | (2006.01) |
| F17D 3/00 | (2006.01) |
| G01L 27/00 | (2006.01) |

(52) U.S. Cl. .......... 700/19; 700/275; 700/282; 700/301; 137/1; 137/557; 137/559; 73/1.71; 73/1.72

(58) Field of Classification Search ............ 137/115.01, 137/1, 557, 559; 700/297, 19, 275, 282, 700/301; 73/1.71, 1.72
See application file for complete search history.

(56) References Cited

U.S. PATENT DOCUMENTS 6,155,282 A * 12/2000 Zachary et al. ............... 137/1

(Continued)

FOREIGN PATENT DOCUMENTS

WO    WO 99/36714    7/1999

*Primary Examiner*—Ronald D Hartman, Jr.
(74) *Attorney, Agent, or Firm*—Raymond R. Ferrera (57) ABSTRACT

A variable function voting solenoid-operated valve apparatus is provide, wherein the apparatus includes a first solenoid-operated valve, a second solenoid-operated valve and a bypass valve disposed in mutual fluid communication, wherein one or more of said first solenoid-operated valve, said second solenoid-operated valve and said bypass valve further comprises one or more air-to-move valve actuators; an air supply for delivering a supply of compressed air to said one or more air-to-move valve actuators; a plurality of pressure sensors, including a first pressure sensor disposed in fluid communication with said first solenoid-operated valve, a second pressure sensor in fluid communication with said second solenoid-operated valve, and a third pressure sensor disposed in fluid communication with said bypass valve; and an exhaust vent for venting pressure accumulated within one or more of said first solenoid-operated valve, said second solenoid-operated valve and said bypass valve to an external environment. Numerous alternative embodiments of the apparatus and testing methods therefor are also provided.

15 Claims, 5 Drawing Sheets

U.S. PATENT DOCUMENTS

| | | |
|---|---|---|
| 6,722,383 B2 | 4/2004 | Summers et al. |
| 6,862,914 B1 * | 3/2005 | Zachary et al. ............. 73/1.72 |
| 2002/0091451 A1 | 7/2002 | Summers et al. |
| 2003/0009314 A1 | 1/2003 | Summers et al. |

* cited by examiner

| BYPASS NOT ACTIVE | PRESSURE SWITCH 1 CONTACT STATUS | PRESSURE SWITCH 2 CONTACT STATUS | PRESSURE SWITCH 3 CONTACT STATUS |
|---|---|---|---|
| SOV1 AND SOV2 ENERGIZED | CLOSED | CLOSED | CLOSED |
| SOV1 AND SOV2 DE-ENERGIZED | OPEN | OPEN | CLOSED |
| SOV1 DE-ENERGIZED AND SOV2 ENERGIZED | OPEN | CLOSED | CLOSED |
| SOV1 ENERGIZED AND SOV2 DE-ENERGIZED | CLOSED | OPEN | CLOSED |
| BYPASS ACTIVE | CLOSED | OPEN | OPEN |

| BYPASS NOT ACTIVE | PRESSURE SWITCH 1 CONTACT STATUS | PRESSURE SWITCH 2 CONTACT STATUS | PRESSURE SWITCH 3 CONTACT STATUS |
|---|---|---|---|
| SOV1 AND SOV2 ENERGIZED | OPEN | OPEN | CLOSED |
| SOV1 AND SOV2 DE-ENERGIZED | CLOSED | CLOSED | CLOSED |
| SOV1 DE-ENERGIZED AND SOV2 ENERGIZED | CLOSED | OPEN | CLOSED |
| SOV1 ENERGIZED AND SOV2 DE-ENERGIZED | OPEN | CLOSED | CLOSED |
| BYPASS ACTIVE | CLOSED | OPEN | OPEN |

*FIG. 5*

VARIABLE FUNCTION VOTING SOLENOID-OPERATED VALVE APPARATUS HAVING AIR-TO-MOVE VALVE ACTUATORS AND TESTING METHOD THEREFOR

CROSS-REFERENCE TO RELATED APPLICATIONS

The present application is a continuation-in-part of prior application Ser. No. 10/828,361 filed Apr. 20, 2004 now abandoned, which is a continuation-in-part of prior application Ser. No. 10/663,588 filed Sep. 17, 2003 now U.S Pat.No. 6,862,914, which is a divisional of prior application Ser. No. 09/756,844 filed Jan. 9, 2001, now issued as U.S. Pat. No. 6,722,383.

BACKGROUND OF THE INVENTION

1. Field of the Invention

The present invention relates generally to multiple voting solenoid-operated valve devices for testing and controlling process and fluid transport systems, and more particularly to a variable function voting solenoid-operated valve apparatus having air-to-move fail last position actuators to direct the flow of a fluid media.

2. Background of the Invention

Modern process or manufacturing plants consist of innumerable individual components. These components are integrated to form operational systems controlled by instrumentation and control systems consisting of a variety of sensors and controllers. The operation and control systems serve not only to achieve desired process conditions and parameters, but also to allow a monitor (e.g., an operator or a processor) to safely modify or discontinue operation of all or part of the plant's systems and components if necessary in order to avoid circumstances that define a safety condition.

One previously known safety system operates by isolating or venting process fluids when an unsafe operating condition has been detected by the safety system. Depending on the particular operational parameters, isolation and/or venting of process fluid can be accomplished by actuating one or more solenoid-operated process valves.

Solenoid valves are essentially electro-mechanical devices that use a solenoid to control valve actuation. Previously known solenoid-operated process valves generally include a wire coil and a movable plunger that seats against the coil; when electrical current is supplied to the solenoid coil, an actuating magnetic field is induced that acts upon the plunger. If an attached positioner detects a difference in position between the plunger's position and the control signal, the positioner sends a signal to move the plunger so that the correct position is achieved.

Those of ordinary skill in the art have found such systems deficient, however, primarily because of their dependence on electronic control signals and inexpensive mechanical parts. For example, should one or more of the coil, positioner or plunger fail, there is no way to accurately test whether the position control signal matches the actual solenoid position so that a change in state should be expected.

In other previously known devices, a pneumatic fluid supply is directed toward a process valve actuator through a solenoid-operated valve in order to vent process pressure when a predefined safety condition is detected. Typically, a pneumatic pressure source is supplied to one side of the actuator, while accumulated pressure is vented on the other side. If an associated solenoid changes state or position in a predefined manner, e.g., when a solenoid is de-energized by an operator or an associated logic control system, the plant system being tested is placed in an operational mode defined as a "safety action".

Those of ordinary skill in the art will appreciate, however, that testing and maintenance of individual solenoid-operated valves should preferably occur without initiation of the safety action, so that there is no need to take system being monitored off-line during testing and maintenance. Thus, single solenoid valve configurations have in the past imposed a trade-off for operators between either discontinuing safety monitoring during testing and maintenance, or else risking false initiation of the safety action as a result of limited or incomplete testing and maintenance.

For example, a "1 out of 1" solenoid-operated valve configuration is previously known in which a single solenoid-operated valve activates the system's safety action by actuating process valves upon detection of an unsafe condition. Such configurations can achieve high plant safety availability when valve operation is regularly tested by first de-energizing the solenoid valve, and then monitoring a venting of the fluid or pneumatic supply through an exhaust body or manifold. Since the process valve and, ultimately, the process or fluid transport system (or some of the system's constituent components) may be adversely affected by such venting, testing of the solenoid-operated valve can only be performed under plant bypass conditions, wherein the fluid or pneumatic supply is allowed to pass directly to one side of the process valve actuator while pressure is vented on the other side of the actuator by means of a bypass valve. However, when the solenoid-operated valve is bypassed for testing, the safety action (actuation of the process valve) intended to avoid the unsafe condition cannot be initiated.

Thus, in practice, the overall safety availability performance of a 1 out of 1 solenoid-operated valve is limited by the percentage of operational time required in a bypass state for testing and maintenance. Moreover, such configurations can achieve only relatively low plant system reliability outside of testing and routine maintenance, since an unexpected component failure within the solenoid-operated valve, e.g., a coil failure or the like, will necessarily cause an inadvertent venting or isolation of the fluid or pneumatic supply, i.e., actuation of the process valve and initiation of the safety action.

A "1 out of 2" solenoid-operated valve configuration is also known wherein the correct functioning of one of a pair of solenoid-operated valves connected in operative association is required to actuate the process valve and initiate the safety action. Since only one of the solenoid-operated valves is required to actuate the process valve, relatively high plant safety availability is inherently provided.

Moreover, such configurations do not require the high testing frequency of the 1 out of 1 solenoid-operated valve system. However, routine testing and maintenance of the device are still required for ordinary safety applications. Similar to the 1 out of 1 solenoid valve, the 1 out of 2 configuration typically requires bypassing the system's safety action during testing. Accordingly, the device is incapable of actuating the process valve, and of isolating or venting the process fluid supply in response to an unsafe condition while the system is in bypass mode. Thus, the safety availability performance of the 1 out of 2 solenoid is limited by the percentage of operational time required for bypassing and testing. Moreover, since there are two discrete solenoids capable of initiating the safety action, a failure in a single solenoid-operated valve coil can lead to the inadvertent actuation of the process valve and isolation or venting of the process fluid.

A "2 out of 2" configuration has also been employed wherein both solenoid-operated valves must correctly function to actuate the process valve and initiate the safety action. Since both solenoid-operated valves must function properly, high plant system reliability is readily obtained. However, since the likelihood of individual component failure within the solenoid-operated valve system is effectively doubled (for example, both solenoid-operated valves must always function properly), the configuration suffers from relatively low safety availability unless it is frequently function-tested. Also, initiation of the safety action is prevented during testing and maintenance because the plant system must be bypassed for such functions, wherein the fluid or pneumatic supply is allowed to pass directly to the process valve or its constituent components by means of a bypass valve. When the solenoid-operated valves are bypassed for testing, the safety action (i.e., actuation of the process valve) intended to avoid the unsafe condition cannot be initiated. Moreover, the testing and maintenance cycle is generally time and manpower intensive since most of the known 2 out of 2 configuration is still tested manually. As with the previously discussed solenoid-operated valve system, therefore, the safety availability performance of the device is limited by the percentage of operational time required during bypassing and testing or maintenance.

A more sophisticated approach has involved a "2 out of 3" voting solenoid-operated valve system wherein two out of three solenoid-operated valves must operate properly to actuate the process valve and isolate or vent the process fluid. The configuration achieves high safety availability since only two of the three solenoid-operated valves must function to initiate a safety action, and high plant system reliability since two of the three solenoid-operated valves must experience a coil failure or the like for an inadvertent actuation of the process valve and isolation or venting of the process fluid supply to occur. The safety availability is also superior to the previously discussed solenoid systems insofar as the device can be tested or maintained without bypassing the safety action.

In practice, however, those of skill in the pertinent arts have found that the use of three solenoid-operated valves substantially increases the overall price and complexity of the system. Additional logic control system input and output points are also required relative to simpler configurations, and thus installation and operating expenses are correspondingly increased. In short, the high cost and relative complexity of the 2 out of 3 solenoid configuration have greatly limited its effective industrial utility.

Finally, elaborate "quad-voting" configuration have also been attempted wherein both high safety availability and high plant system reliability are reportedly achieved. However, the use of four solenoid-operated valves in a multiple voting configuration has been found to require an unusually large amount of space to accommodate its complex pneumatic tubing and logic control systems, and such complexity obviously increases the associated installation and maintenance expense. Moreover, many commercial operators of voting solenoid-operated valve systems have been found to disfavor the complex quad-voting configuration because of the elevated potential for testing and maintenance error associated therewith.

In view of the foregoing, it is clear there is a widespread need for a double acting variable function voting solenoid-operated valve apparatus having both a high safety availability and high plant system reliability that does not require a plant system to be bypassed during testing and maintenance, and especially for solenoid-operated valves having a redundant control system that can safely and accurately test and monitor a safety system.

SUMMARY OF THE INVENTION

According to one aspect of the invention, a variable function voting solenoid-operated valve apparatus is provided comprising: a first solenoid-operated valve, a second solenoid-operated valve and a bypass valve disposed in mutual fluid communication, wherein one or more of said first solenoid-operated valve, said second solenoid-operated valve and said bypass valve further comprises one or more air-to-move valve actuators; an air supply for delivering a supply of compressed air to said one or more air-to-move valve actuators; a plurality of pressure sensors, including a first pressure sensor disposed in fluid communication with said first solenoid-operated valve, a second pressure sensor in fluid communication with said second solenoid-operated valve, and a third pressure sensor disposed in fluid communication with said bypass valve; and an exhaust vent for venting pressure accumulated within one or more of said first solenoid-operated valve, said second solenoid-operated valve and said bypass valve to an external environment.

According to further aspects of the invention, a variable function voting solenoid-operated valve apparatus useful for testing and controlling industrial process systems is provided comprising: a first solenoid-operated valve, a second solenoid-operated valve and a bypass valve disposed in mutual fluid communication, wherein one or more of said first solenoid-operated valve, said second solenoid-operated valve and said bypass valve further comprises one or more air-to-move valve actuators; a plurality of pressure sensors, including a first pressure sensor disposed in fluid communication with said first solenoid-operated valve, a second pressure sensor disposed in fluid communication with said second solenoid-operated valve, and a third pressure sensor disposed in fluid communication with said bypass valve; and a logic control system, wherein said logic control system permits an operator to selectively enable one of at least two discrete operational modes, and wherein said at least two discrete operational modes includes a 1-out-of-1 with hot stand-by mode and a 2-out-of-2 with high diagnostics mode.

According to still further aspects of the invention, methods of testing a variable function voting solenoid-operated valve apparatus in a either a double acting energize to trip diagnostic mode or a double acting de-energize to trip diagnostic mode is provided comprising: disposing a first solenoid-operated valve, a second solenoid-operated valve and a bypass valve in mutual fluid communication; disposing one or more air-to-move valve actuators within one or more of said first solenoid-operated valve, said second solenoid-operated valve and said bypass valve; disposing an air supply in fluid communication with said one or more air-to-move valve actuators; disposing a first pressure sensor in fluid communication with said first solenoid-operated valve, a second pressure sensor in fluid communication with said second solenoid-operated valve, and a third pressure sensor in fluid communication with said bypass valve; and disposing an exhaust vent in fluid communication with one or more of said first solenoid-operated valve, said second solenoid-operated valve and said bypass valve. Depending on the particular diagnostic mode in which the test is performed, various methods of energizing and de-energizing the valves and monitoring associated pressure sensors are also provided.

DETAILED DESCRIPTION OF THE INVENTION

U.S. Pat. No. 6,722,383 discloses a variable function voting solenoid-operated valve apparatus having two discrete operational modes, viz., a 1 out of 1 with high safety mode ("1oo1-HS") and a 2 out of 2 with high diagnostics mode ("2oo2-D"). The device employs two electronically actuated solenoid-operated valves functioning in cooperative association with a bypass valve and a plurality of pressure switches.

Figure 1:
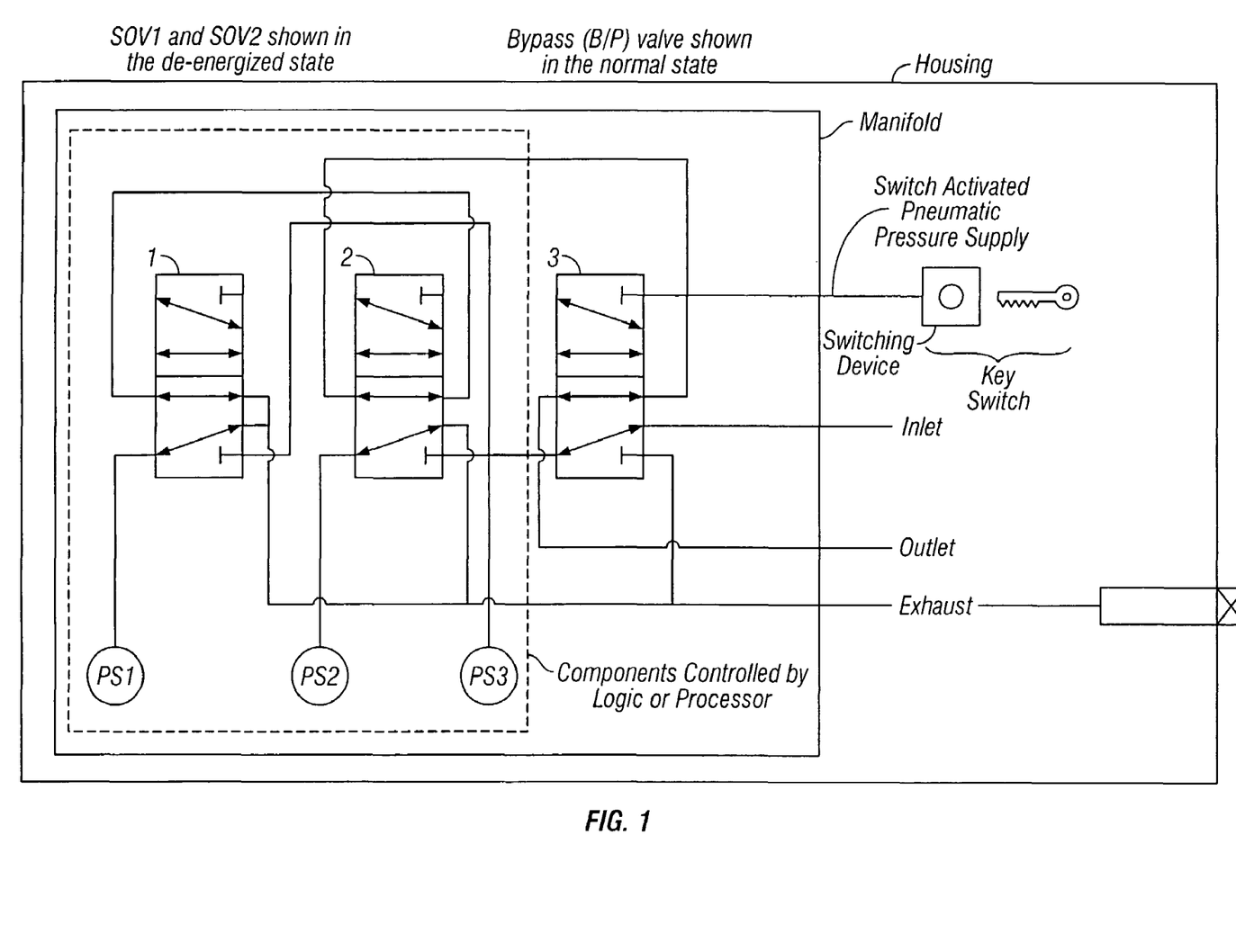
FIG. 1 is a schematic representation of a first aspect of the present invention.

For example, and referring now to FIG. 1, a schematic representation of a variable voting solenoid-operated valve apparatus is provided wherein a housing member houses a first solenoid-operated valve 1 and a second solenoid-operated valve 2; a switch actuated bypass valve 3; and a plurality of pressure switches PS1, PS2 and PS3, including a first pressure switch PS1 in fluid communication with first solenoid-operated valve 1, a second pressure switch PS2 in fluid communication with second solenoid-operated valve 2, and a third pressure switch PS3 in fluid communication with switch actuated bypass valve 3. According to a further aspect of the invention, the solenoid-operated valve package is controlled using a logic control system that selectively enables an operator to select from at least two operational modes, including a 2oo2-D mode and a 1oo1-HS mode.

In the 2oo2-D operational mode, a plant can retain the benefits of the standard 2oo2 solenoid configurations previously described, but also realize improved safety availability since the package can be tested or maintained without being bypassed prior to initiation of the testing. During normal operations, when each of solenoid-operated valves 1 and 2 are actuated by an electromotive force provided by means of the logic control system or processor, the contacts for pressure switches PS1 and PS2 are opened, and the contact for pressure switch PS3 is closed. When an unsafe condition is detected and a safety action initiated (such as venting or isolation of the fluid), the process valve is actuated when both of solenoid-operated valves 1 and 2 are immediately de-energized, thereby transferring the pneumatic supply to an exhaust port. Due to the loss of pneumatic pressure in each of solenoid-operated valves 1 and 2, pressure switches PS1 and PS2 sense a decrease in pressure and close their respective contacts.

While operating in a 2oo2-D mode, the ability to initiate a safety action (i.e., a venting or isolation of the process fluid) is never compromised during testing, since each of solenoid-operated valves 1 and 2 could immediately be de-energized at any time during the cycle. Unlike previously known 2oo2 configuration, therefore, no bypassing of the package prior to initiation of testing is required.

The 1oo1-HS configuration utilizes the same package as the 2oo2-D, but the operational mode is distinctly different. In this mode, one solenoid-operated valve is actuated by electromotive force provided by means of the logic control system or processor, during normal operations, while the other solenoid-operated valve remains de-energized and in a stand-by state. Either solenoid-operated valve could be in the energized state, while the other is in a de-energized, stand-by state. The choice of which solenoid is energized and which is in stand-by mode may be alternated or otherwise varied over time.

If solenoid-operated valve 1 is faulty and experiences, for example, a coil failure, solenoid-operated valve 1 will initiate a safety action and move to a venting state. Pressure switch PS1 then closes in response to the decrease in pneumatic supply pressure. The logic control system or processor receiving the pressure switch information from pressure switch PS1 detects that solenoid-operated valve 1 has moved to a vent state inadvertently (i.e., a fault detection). The logic control system or processor then energizes solenoid-operated valve 2, thereby transferring the fluid or pneumatic supply to the plant system or constituent component. In this manner, inadvertent initiation of the safety action is aborted, and plant system reliability is therefore improved.

A switch-actuated bypass valve is also provided in the package, and may include, for example, a key switch for secured manual operation. The bypass function is provided to allow maintenance on the package without interruption of the plant system. This aspect of the invention includes a bypass valve 3, which routes the pneumatic supply directly to the desired plant system or constituent component. The state of bypass valve 3 is detected by pressure switch PS3. When bypass valve 3 is moved or set in the bypass position, pressure switch PS3 opens and indicates to the processor or logic control system that the package is in bypass mode. Such bypassing is required only for maintenance, so loss of access to the safety action is minimized.

When diagnostic information related to the performance of the safety action is desired, a partial movement of the process valve can be executed to prove the process valve is capable of actuating to the safe state. Each of operational mode 2oo2-D and 1oo1-HS provides the capability of executing the test of the performance of the safety action.

For still further safety and reliability, a redundant control system is added to the device. In a presently preferred embodiment, the redundant control system comprises a plurality of air-to-move valve actuators capable of actuating the valve even in the event of a failed coil or the like.

Those of ordinary skill in the art will appreciate that when known process valves employ air-to-move fail-last position actuators, air pressure is applied to one side of the actuator while accumulated pressure is vented on the other side of the actuator, thereby moving the valve to either an opened or closed position; in such fashion, the need for electronic actuation of the valves is removed. Double acting solenoid-operated valve configurations having air-to-move fail last position actuators are previously unknown, however.

Figure 2:
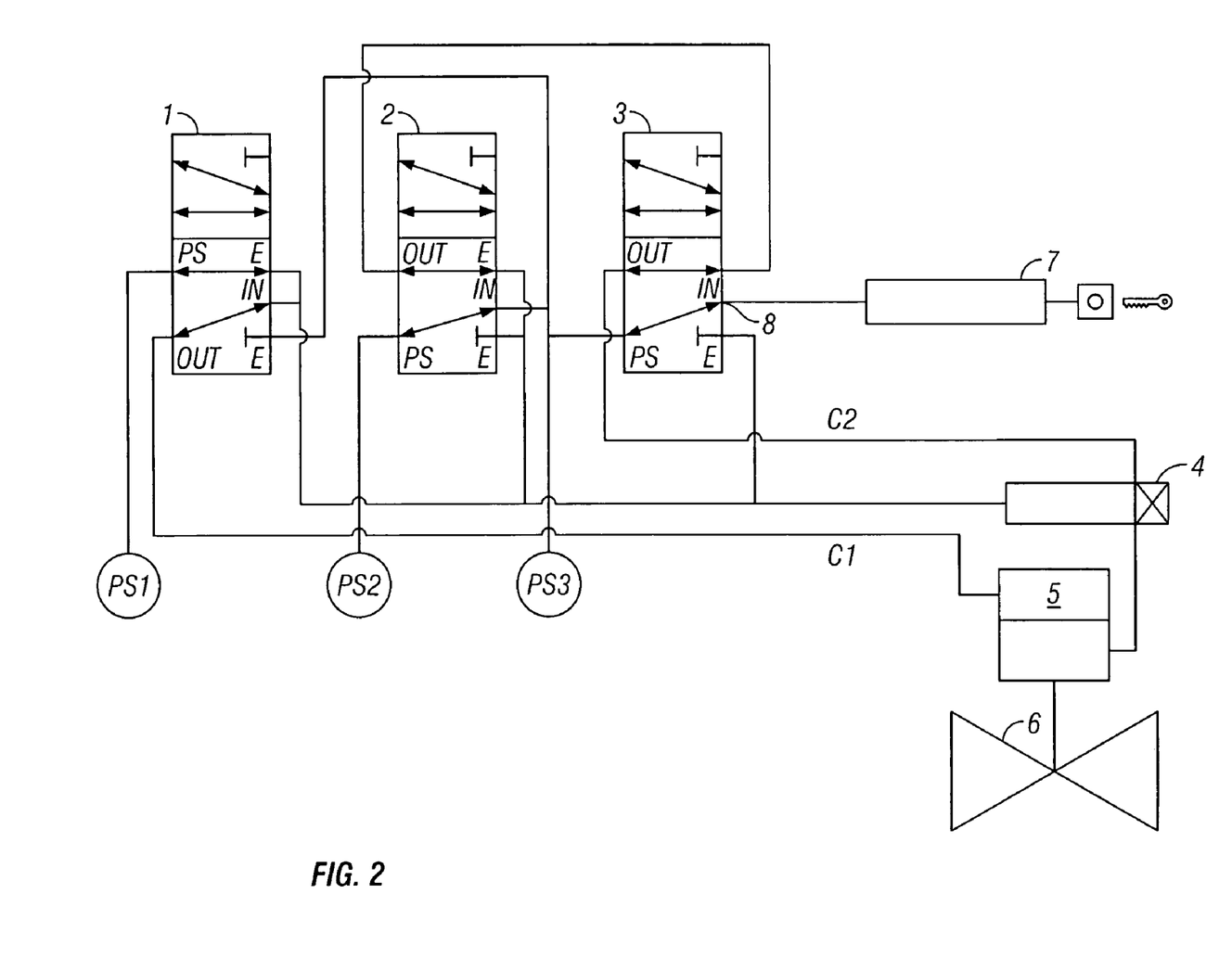
FIG. 2 is a schematic representation of a second aspect of the present invention.

Referring now to the example embodiments depicted in FIG. 2, a double acting solenoid-operated valve apparatus having air-to-move valve actuators is shown, comprising a first solenoid-operated valve 1 and a second solenoid-operated valve 2; a bypass valve 3; a plurality of pressure switches PS1, PS2 and PS3, including a first pressure switch PS1 in fluid communication with first solenoid-operated valve 1, a second pressure switch PS2 in fluid communication with second solenoid-operated valve 2, and a third pressure switch PS3 in fluid communication with bypass valve 3.

In a preferred embodiment, one or more of solenoid-operated valves 1 and 2 and bypass valve 3 are equipped with air-to-move position actuators, so that the valves can be actuated by means of air pressure from air supply 7 even in the event of a coil failure or the like. In other embodiments, the solenoid-operated valves rely on the air-to-move actuators exclusively, and coils and the like are omitted from the system. In still other embodiments, some or all of the components described above are controlled by means of a logic control system disposed within redundant control system 5 or elsewhere in the package.

Air supply 7 is disposed so as to supply pressure to bypass valve 3 upon via air inlet 8; since each of solenoid-operated valves 1 and 2 is disposed in fluid communication with bypass valve 3, air supply 7 is also directed to the solenoid-operated valves via air inlet 8, though in other embodiments, air supply 7 can be delivered to solenoid-operated valves 1 and 2 by means of other air inlets. According to one embodiment, the device also has a redundant control system 5 for monitoring and controlling signals sent and received by connectors C1 and C2; in some embodiments, redundant control system 5 further comprises a logic control system that monitors and controls the signals sent by connectors C1 and C2. Redundant control system 5 is also in communication with a process valve 6, and basically functions as a switch, so that a safety action can still be initiated if necessary during testing of the solenoid-operated valves and the bypass valve. A partial safety action can also be initiated for testing whether process valve 6 is capable of opening (or closing) during a safety action.

The embodiment depicted in FIG. 2 shows process valve 6 disposed in a closed state, and assumes that a closed state is also the process valve 6 safe state. In embodiments having a valve safe state of opened, connections to the valve actuators from the redundant control system 5 (i.e., shown as connectors C1 and C2) are reversed. The embodiment of FIG. 2 also shows each of first solenoid-operated valve 1 and second solenoid-operated valve 2 disposed in an energized state, while bypass valve 3 is disposed in a normal (i.e., non-bypass) state.

Figure 3:
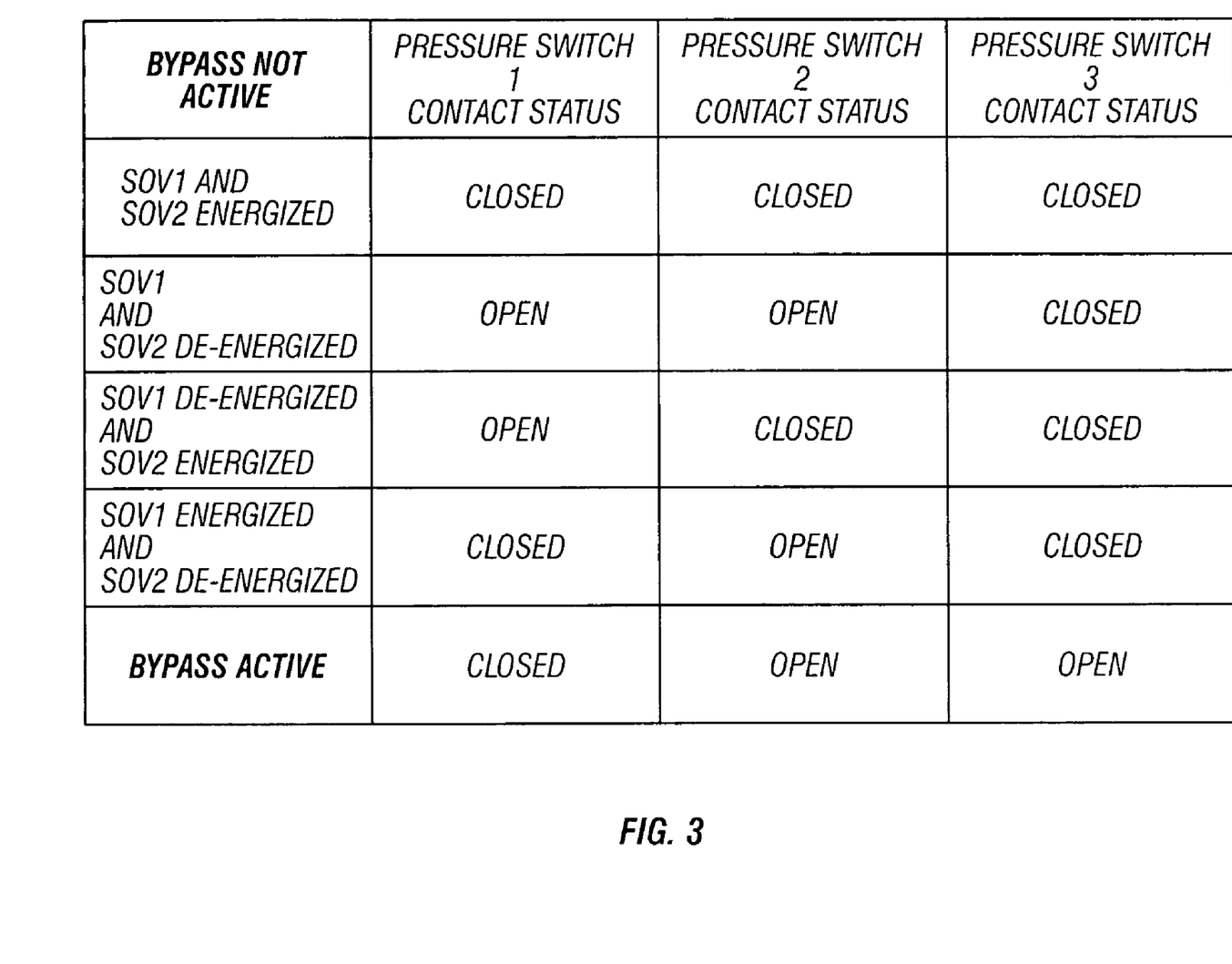
FIG. 3 is a truth table summarizing the contact status of a plurality of pressure switches according to a further aspect of the invention.

Referring now to FIG. 3, in order to perform a test of the package in a double acting energize to trip diagnostic mode, bypass valve 3 remains in a normal state while each of solenoid-operated valves 1 and 2 are energized by air supply 7 in response to a control signal, for example, as might be issued by a logic control system disposed in electrical communication with redundant control system 5. In some embodiments, there is no logic system or the logic system is disabled, and the energize control signal is instead delivered from an external source (e.g., the signal for air supply 7 to energize first solenoid-operated valve 1 and second solenoid-operated valve 2 can be delivered manually by an operator). The contact status of first pressure switch PS1 and second pressure switch PS2 (associated with first solenoid-operated valve 1 and second solenoid-operated valve 2, respectively) are then checked and, assuming the device is functioning correctly, each will confirm a closed status. Likewise, third pressure switch PS3 (associated with bypass valve 3) is checked and confirmed to also confirm a closed status.

After de-energizing each of solenoid-operated valves 1 and 2 while bypass valve 3 remains in a normal state (for example, by venting the contents of first solenoid-operated valve 1 and second solenoid-operated valve 2 out of the package through an exhaust vent 4), the status of pressure sensors PS1 and PS2 can again be checked, and confirmed to reflect an opened status. Again, pressure switch PS3 is checked, and, since bypass valve 3 is still set in a normal state and the package is operating correctly, pressure switch PS3 will also confirm a closed status.

It is important to note that by venting the air pressure accumulated with first solenoid-operated valve 1 and second solenoid-operated valve 2 to an external environment via exhaust vent 4, process valve 6 will remain closed, so that an associated plant system or the like remains on-line, even while testing is being carried out. However, bypass valve 3 can still be moved into an open position at any time, so that a safety action can be generated if the package were to fail for some reason, or if a test of the safety action is desired.

Continuing the testing method, second solenoid-operated valve 2 is then re-energized while first solenoid-operated valve 1 remains de-energized. As before, bypass valve 3 is kept in a normal state subject only to a package failure or a safety action test. A check of each of pressure sensors PS2 and PS3 should confirm a closed status. Since first solenoid-operated valve 1 has not been energized, a check of pressure sensor PS1 should confirm an open state status. By reversing this stage and energizing first solenoid-operated valve 1 while de-energizing second solenoid-operated valve 2 and maintaining bypass valve 3 in a normal state, the contact status of first pressure sensor PS1 and second pressure sensor PS2 are also reversed. In particular, each of first pressure PS1 and third pressure sensor PS3 (associated with first solenoid-operated valve 1 and bypass valve 3, respectively) should now reflect a closed status, while second pressure sensor PS2 (associated with second solenoid-operated valve 2) indicates an open state.

Finally, after re-energizing each of first solenoid-operated valve 1 and second solenoid-operated valve 2 and then changing the state of bypass valve 3 from a normal state to an active state, each of second pressure sensor PS2 and third pressure sensor PS3 (associated with second solenoid-operated valve 2 and bypass valve 3, respectively) are found to reflect an open status, while first pressure sensor PS1 (associated with first solenoid-operated valve 1) reflects a closed status.

In such fashion, each of first solenoid-operated valve 1, second solenoid-operated valve 2, and bypass valve 3 can be safely and accurately tested or subjected to maintenance without interruption of the plant system with which the package is associated.

As stated, the bypass function is specifically provided to allow testing and maintenance of the package without interruption of an associated plant system. The state of bypass valve 3 is detected by pressure switch PS3; when bypass valve 3 is moved or set in the active position, pressure switch PS3 opens, and indicates to the logic control system or processor that the package is in bypass mode. Generally, bypassing is performed only during maintenance, so loss of access to the safety action is effectively minimized. However, the package can also be used to test the performance of the safety action by initiating only a brief or partial movement of process valve 6, so as to verify that process valve 6 is still capable of actuating to the safe state without disrupting the plant system being tested, and while diagnostic information regarding the safety action is assembled.

Figure 4:
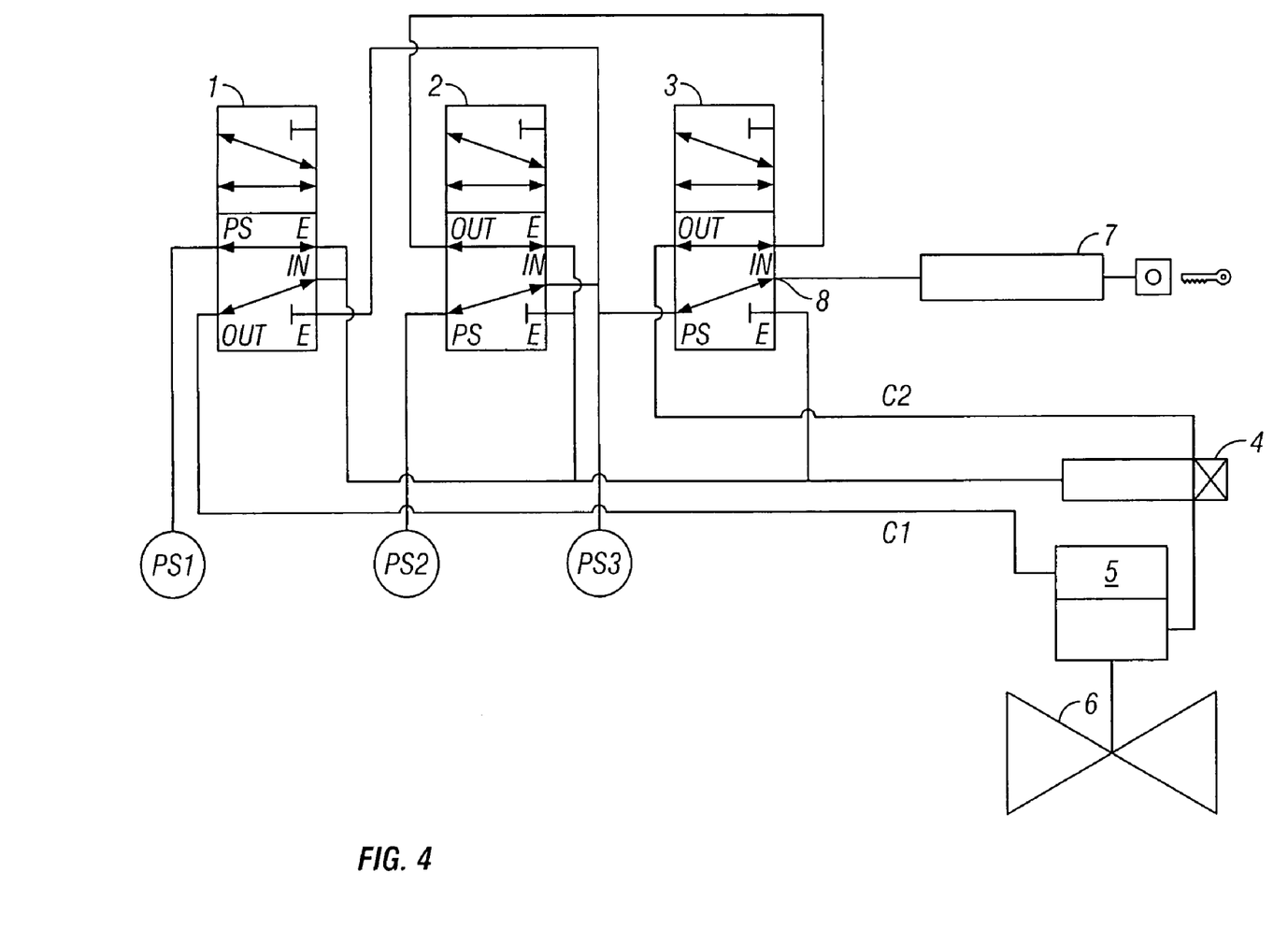
FIG. 4 is a schematic representation of a third aspect of the present invention.
Figure 5:
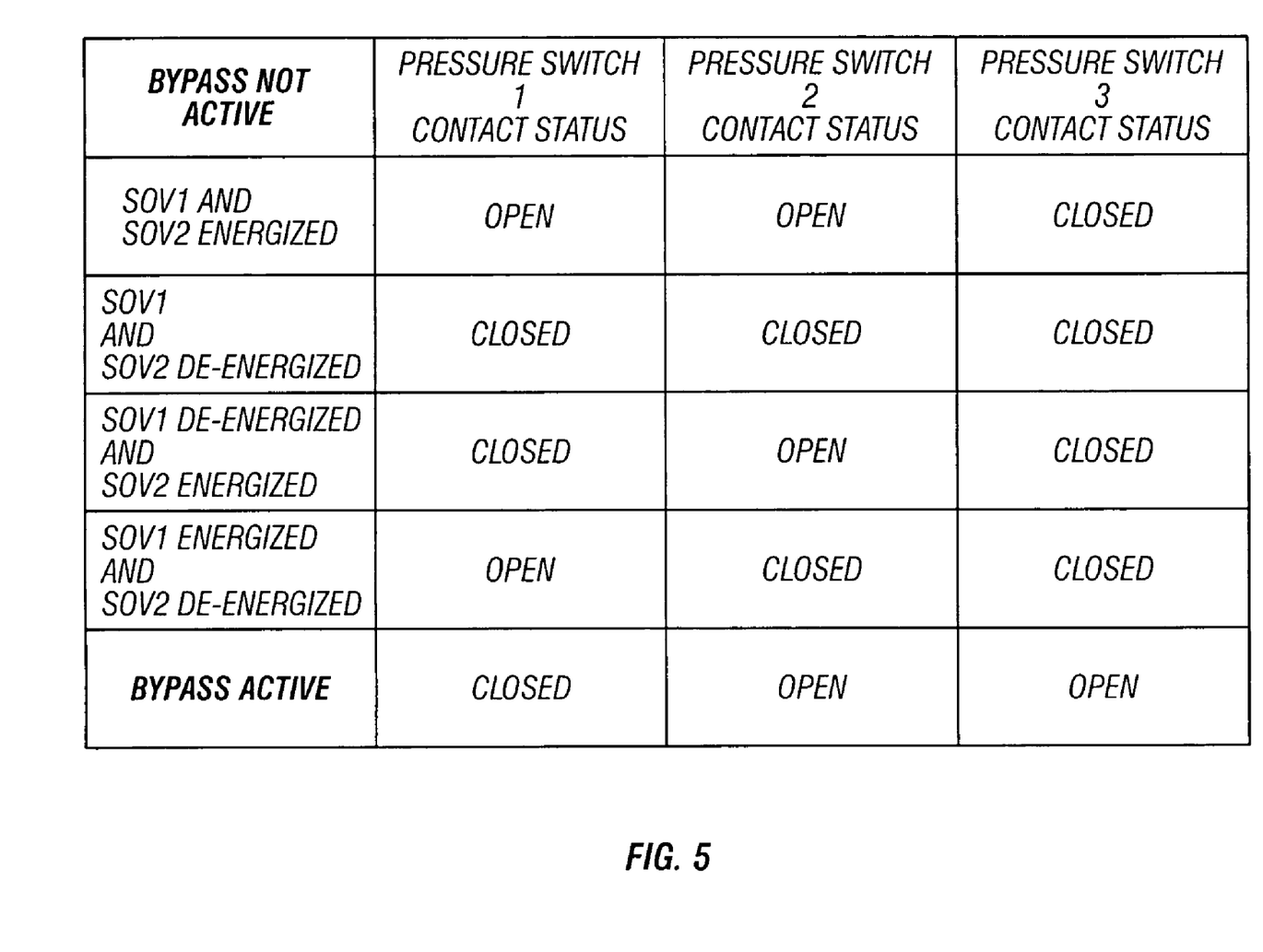
FIG. 5 is a second truth table summarizing the contact status of a plurality of pressure switches according to a further aspect of the invention.

Referring now to FIGS. 4 and 5, in order to perform an on-line test of the package in a double acting de-energize to trip diagnostics mode, bypass valve 3 remains in a normal state while each of solenoid-operated valves 1 and 2 are energized by air supply 7 in response to a control signal. In embodiments where there is no logic system or the logic system is disabled, the energize control signal is instead delivered from an external source (e.g., the signal for air supply 7 to energize first solenoid-operated valve 1 and second solenoid-operated valve 2 can be delivered manually by an operator). The contact status of first pressure switch PS1 and second pressure switch PS2 (associated with first solenoid-operated valve 1 and second solenoid-operated valve 2, respectively) are then checked and, assuming the device is functioning correctly, confirmed to be in an open state. Third pressure switch PS3 (associated with bypass valve 3) is then checked and confirmed to reflect a closed status.

After de-energizing each of solenoid-operated valves 1 and 2 while bypass valve 3 remains in a normal state (for example, by venting the contents of first solenoid-operated valve 1 and second solenoid-operated valve 2 to an external environment through exhaust vent 4), the state of pressure sensors PS1 and PS2 are checked and confirmed to reflect a closed status. Again, so long as bypass valve 3 is set in a normal state and the package is operating correctly, third pressure sensor PS3 will confirm a closed status.

By venting the pressure accumulated within first solenoid-operated valve 1 and second solenoid-operated valve 2 to an external environment, process valve 6 remains in a closed state so that an associated plant system or the like remains on-line, even while testing is being carried out. However, bypass valve 3 can still be moved into an active (bypassed) state at any time, so that a safety action can still be generated if the package were to fail for some reason, or if a test of the safety action is desired.

Continuing, second solenoid-operated valve 2 is then re-energized while first solenoid-operated valve 1 remains de-energized. As before, bypass valve 3 is kept in a normal state subject only to a package failure or a safety action test. A check of each of first and third pressure sensor PS1 and PS3 should confirm a closed contact status; meanwhile, second pressure sensor PS2 should reflect an open contact status.

By reversing this stage and energizing first solenoid-operated valve 1 while de-energizing second solenoid-operated valve 2 and maintaining bypass valve 3 in a normal state, the contact status of first pressure sensor PS1 and second pressure sensor PS2 are also reversed. In particular, each of second pressure PS2 and third pressure sensor PS3 (associated with second solenoid-operated valve 2 and bypass valve 3, respectively) should now reflect a closed contact status, while first pressure sensor PS1 (associated with first solenoid-operated valve 1) indicates an open contact status.

Finally, after re-energizing each of first solenoid-operated valve 1 and second solenoid-operated valve 2 and then changing the state of bypass valve 3 from a normal state to an active state, thereby temporarily bypassing the package, each of second pressure sensor PS2 and third pressure sensor PS3 (associated with second solenoid-operated valve 2 and bypass valve 3, respectively) are found to reflect an open contact status, while first pressure sensor PS1 (associated with first solenoid-operated valve 1) reflects a closed contact status.

In such fashion, each of first solenoid-operated valve 1, second solenoid-operated valve 2, and bypass valve 3 can be safely and accurately tested or subjected to maintenance without requiring interruption of the plant system with which the package is associated.

As mentioned, the state of bypass valve 3 is detected by pressure switch PS3; when bypass valve 3 is moved or set in the active position, pressure switch PS3 opens and indicates to the processor or logic control system that the package is in bypass mode. To test the performance of the safety action, a brief or partial movement of process valve 6 is initiated, and it is verified that process valve 6 is capable of actuating to the safe state without disrupting the plant system being tested, and while diagnostic information regarding the safety action is assembled.

The double action testing modes described above uniquely provide improved, variable functionality and greater operator flexibility for air-to-move fail last position valves than any other known solenoid-operated valve configuration. The package's superior testing and maintenance characteristics and fault detection capabilities provide maximum safety availability while maintaining high plant system reliability.

The foregoing detailed description of the invention is intended primarily for illustrative purposes, and is not intended to include all possible aspects of the present invention. Moreover, while the invention has been shown and described with respect to an exemplary embodiment, those of skill in the pertinent arts should appreciate that the foregoing detailed description, and various other modifications, omissions and additions, so long as in the general form and detail thereof, may be made without departing from either the spirit or scope of the present invention.

What is claimed is:

1. A variable function voting solenoid-operated valve apparatus, the apparatus comprising:
    a first solenoid-operated valve, a second solenoid-operated valve and a bypass valve disposed in mutual fluid communication, wherein one or more of said first solenoid-operated valve, said second solenoid-operated valve and said bypass valve further comprises one or more air-to-move valve actuators;
    an air supply for delivering a supply of compressed air to said one or more air-to- move valve actuators;
    a plurality of pressure sensors, including a first pressure sensor disposed in fluid communication with said first solenoid-operated valve, a second pressure sensor in fluid communication with said second solenoid-operated valve, and a third pressure sensor disposed in fluid communication with said bypass valve; and
    an exhaust vent for venting pressure accumulated within one or more of said first solenoid-operated valve, said second solenoid-operated valve and said bypass valve to an external environment.

2. The apparatus of claim 1, further comprising: a logic control system, wherein said logic control system permits an operator of said apparatus to selectively enable one of at least two discrete operational modes, wherein said at least two discrete operational modes comprises a 1-out-of-1 with hot stand-by mode and a 2-out-of-2 with high diagnostics mode.

3. The apparatus of claim 2, further comprising a means for testing said apparatus without bypassing an associated process system when said 2-out-of-2 with high diagnostics mode is enabled.

4. The apparatus of claim 2, further comprising a means for testing said apparatus without bypassing an associated process system when said 1-out-of-1 with hot standby mode is enabled.

5. The apparatus of claim 1, wherein said bypass valve further comprises a means for initiating a safety action.

6. The apparatus of claim 5, wherein said bypass valve further comprises a means for initiating a partial safety action.

7. The apparatus of claim 1, wherein said air supply further comprises a switching device.

8. The apparatus of claim 7, wherein said switching device further comprises a key switch.

9. A variable function voting solenoid-operated valve apparatus useful for testing and controlling industrial process systems, the apparatus comprising:
    a first solenoid-operated valve, a second solenoid-operated valve and a bypass valve disposed in mutual fluid communication, wherein one or more of said first solenoid-operated valve, said second solenoid-operated valve and said bypass valve further comprises one or more air-to-move valve actuators;

a plurality of pressure sensors, including a first pressure sensor disposed in fluid communication with said first solenoid-operated valve, a second pressure sensor disposed in fluid communication with said second solenoid-operated valve, and a third pressure sensor disposed in fluid communication with said bypass valve; and a logic control system, wherein said logic control system permits an operator to selectively enable one of at least two discrete operational modes, and wherein said at least two discrete operational modes includes a 1-out-of-1 with hot stand-by mode and a 2-out-of-2 with high diagnostics mode.

10. A method of testing a variable function voting solenoid-operated valve apparatus in a double acting energize to trip diagnostic mode, the method compnsrng:

attaching a first solenoid-operated valve, a second solenoid-operated valve and a bypass valve in mutual fluid communication;

actuating each of said first solenoid-operated valve, said second solenoid-operated valve and said bypass valve with one or more air-to-move valve actuators, wherein said air-to-move valve actuator is disposed within one or more of said first solenoid-operated valve, said second solenoid-operated valve and said bypass valve;

supplying air to said air-to-move valve actuators with an air supply, wherein said air supply is in fluid communication with said one or more air-to-move valve actuators;

identifying the status of said first solenoid-operated valve with a first pressure sensor, said second solenoid-operated valve with a second pressure sensor, and said bypass valve with a third pressure sensor, wherein said first, second, and third pressure sensors are in respective fluid communication with said first solenoid-operated valve, said second solenoid-operated valve, and said bypass valve; and venting an accumulated pressure within one or more of said first solenoid-operated valve, said second solenoid-operated valve and said bypass valve to an external environment with an exhaust vent, wherein said exhaust vent is disposed in fluid communication with one or more of said first solenoid-operated valve, said second solenoid-operated valve and said bypass valve.

11. The method of claim 10, further comprising:

energizing said first solenoid-operated valve and confirming that said first pressure sensor indicates a closed contact status;

energizing said second solenoid-operated valve and confirming that said second pressure sensor indicates a closed contact status; and disposing said bypass valve in a normal position and confirming that said third pressure sensor indicates a closed status.

12. The method of claim 10 further comprising:

de-energizing said first solenoid-operated valve and confirming that said first pressure sensor indicates an open contact status;

de-energizing said second solenoid-operated valve and confirming that said second pressure sensor indicates an open contact status; and disposing said bypass valve in a normal position and confirming that said third pressure sensor indicates a closed contact status.

13. The method of claim 10, further comprising:

de-energizing said first solenoid-operated valve and confirming that said first pressure sensor indicates an open contact status;

energizing said second solenoid-operated valve and confirming that said second pressure sensor indicates a closed contact status; and disposing said bypass valve in a normal position and confirming that said third pressure sensor indicates a closed contact status.

14. The method of claim 10, further comprising: energizing said first solenoid-operated valve and confirming that said first pressure sensor indicates a closed contact status;

de-energizing said second solenoid-operated valve and confirming that said second pressure sensor indicates an open contact status; and disposing said bypass valve in a closed position and confirming that said third pressure sensor indicates a closed contact status.

15. The method of claim 10, further comprising:

disposing said bypass valve in a bypass position and confirming that said first pressure sensor indicates an closed contact status, said second pressure sensor indicates an open contact status, and said third pressure sensor indicates an open contact status.

* * * * *